Patented May 16, 1939

2,158,510

UNITED STATES PATENT OFFICE 2,158,510

METHOD FOR OPERATING CUPOLA FURNACES

Karl Lauer, Gelsenkirchen, Germany, assignor to Deutsche Eisenwerke Aktiengesellschaft, Mulheim-on-the-Ruhr, Germany, a body corporate No Drawing. Application June 16, 1938, Serial No. 214,045. In Germany June 19, 1937

10 Claims. (Cl. 75—43)

It is known in foundry practice, when melting cast iron in a cupola furnace, to add to the iron charge a more or less great percentage of steel scrap, wrought iron waste or other iron poor in carbon, and as far as possible in lumps of relatively coarse and large cross-section adapted to the diameter of the furnace, and for melting of such charges to use only the quantities of coke usual for the remelting of pig iron or pig iron and broken cast iron. The steel addition to the charge has for its object to reduce the carbon content of the molten iron and also effects an increase of the melting temperature.

Steel and wrought iron wastes have also been used in the form of chips or sheet waste as steel addition to the cupola iron charge. These inferior small piece wastes have either been introduced into the melting zone of the furnace in compressed state with the aid of an eccentric press or they have been charged with the iron charge in as compressed a state as possible in suitable sheet metal containers, or briquetted into tightly compressed state with or without binding agent, when in most instances an increase of the quantity of charge coke was considered necessary. In all these remelting processes, however, a considerable loss of iron cannot be avoided.

Concerning the consumption in charge coke of cupola furnaces, i. e., the quantity of coke to be used in the furnace for each iron charge, it was heretofore generally considered necessary that at least 8 to 10% charge coke be used for obtaining perfect, sufficiently hot running cast iron in continuous service.

The inventor of the present method has discovered that, on the one hand, the considerable amount of heat developed by the unavoidable loss of steel waste and the like can be utilized economically in a surprising manner in the heat balance of the cupola furnace and, on the other hand, that the furnace can actually be operated in continuous service with a smaller quantity of charge coke than usual, in that, under otherwise similar conditions, the portion of coke lacking from the usual quantity of charge coke can be replaced by steel wool or similar iron poor in carbon, of large surface and small cross section introduced into the furnace as a heat generating means in loose state.

Whereas hitherto in normal iron charges a normal minimum quantity of coke was necessary for every furnace in practical service, which quantity could certainly not be reduced when steel was added to the iron charge, it is absolutely contrary to all hitherto known proposals and to all former practice to work according to the present method, independently of the kind of iron charge, in all instances in continuous service with small quantities of charge coke hitherto not considered practically possible and yet at the same time to be able to continually melt a sufficiently hot iron, as, in spite of the reduced quantity of charge coke extremely favourable furnace conditions with sufficiently high temperatures are produced owing to the burning of the added inferior steel wool or the like.

To obtain the best possible utilization of the combustion heat of the steel wool or the like, the steel wool serving as heat generating means is preferably charged with the coke and mixed therewith. Consequently, this steel wool or the like is not taken into consideration in calculating and compiling the iron charge especially as it has scarcely any or no direct influence on the composition of the molten iron.

Owing to its small cross sectional and large superficial area the steel wool or the like very quickly assumes an extremely high temperature in the furnace and burns in the melting zone developing great specific heat, so that it is absolutely possible, with relatively small additions of steel wool, to replace a considerable portion of the normal usual quantity of charge coke.

It is easily possible with the aid of this novel process to replace 40 to 50% and even up to 60% of the normal usual charge coke by a considerably less great quantity by weight of steel wool or the like, namely by an addition amounting to as much as 30% of the weight of the normal charge coke.

Although—as in all remelting processes of small lump steel wastes—an iron loss occurs in the present method by the almost complete burning of the steel wool or the like, the novel method, owing to the relatively light weight and low value of the necessary quantities of steel wool or the like, ensures a very excellent economy, as not only as much as half or even more of the normal charge coke is saved but as for this large quantity of coke saved a much smaller quantity by weight of steel wool or the like can be substituted which is in any case difficult to briquette or to profitably utilize otherwise.

Another advantage of the new method is, that it is possible, especially in the case of bad qualities of coke with high sulphur content, to considerably reduce the quantity of charge coke without unfavourably influencing the running temperature of the outflowing iron. In the present invention, which allows an increased charge passage owing to the quantitatively and spacially reduced quantities of fuel, it has been unexpectedly found, that the running temperature, as compared with the running temperature of cast iron melted with the normal quantity of coke, is not only as high but may be even higher with correctly measured wool addition corresponding to the reduction of charge coke and with blast conditions adapted to this wool addition.

Owing to the considerably reduced quantity of charge coke there is in the cupola furnace generally sufficient wind, that is oxygen, for the whole burning procedure in the method according to the invention. However, the expert will have no difficulty in regulating, according to the quantity of steel wool or the like and according to the type of furnace, these conditions corresponding to the actual reduced quantity of charge coke and to the actual quantity of steel wool as regards the quantity of air and blast pressure in a manner producing best conditions of combustion and highest running temperatures of the outflowing iron. Thus, in many instances it may be necessary to increase the quantity of air or blast pressure relatively to the blast conditions usual when melting with normal usual charge coke, and in other instances a reduction may possibly be advisable depending upon the quantity of the steel wool addition.

An advantage worth mentioning of the present method from a metallurgical point of view is that, owing to the reduced quantity of charge coke, considerably less sulphur enters the furnace than heretofore so that the cast iron produced turns out extremely poor in sulphur without any additional measure being employed.

It is also possible to work with considerably smaller additions of lime than hitherto, with the result that less heat is required for melting the reduced quantity of lime, this resulting either in a saving in fuel or in a better utilization of the available heat for increasing the temperature of the molten iron.

The novel method is suitable for melting cast iron from all iron charges; thus, the charge may consists, for example, nearly of pig iron and of broken cast iron, but steel or similar iron poor in carbon may also be used in any quantity as a charge constituent. Owing to the small quantity of charge coke and owing to the high melting zone temperature a high duty cast iron of high temperature will be obtained especially in the latter instance.

Exhaustive tests carried out with the method according to the invention have given the following results: A cupola furnace, in which pig iron and broken cast iron were employed as charge, each iron charge of 900 kilogrammes, hitherto required a quantity of charge coke amounting to 90 kilogrammes per iron charge.

According to the novel method the same furnace was operated with the same iron charge of 900 kilogrammes in such a manner that for each iron charges only 45 kilogrammes of charge coke were employed in which 15 kilogrammes of steel wool were distributed. In this manner 10 charges were melted successively and the running temperature remained practically unchanged during the melting down of the charges;

it amounted to about 1360 to 1380° C. On the other hand the iron melted according to the novel method was considerably poorer in sulphur than the iron melted in the usual manner with the usual quantity of charge coke, and furthermore the costs of the melting were considerably lower, as 45 kilogrammes of coke were replaced by only 15 kilogrammes of steel wool, with the result that a saving of 0.75 mk. to 1 mk. per ton of molten cast iron was obtained.

Instead of steel wool, other loose large-surface, small cross sectional steel wastes, such as sheet wastes, sheet iron boxes or the like may be used as heat carriers.

I claim:

1. A method for operating cupola furnaces, which method consists in operating the furnace with a smaller quantity of charge coke than usual and substituting for the lacking portion of the usual quantity of charge coke easily oxidizable metal pieces of small cross-section and large surface charged into the furnace in loose condition and acting as heat generating means.

2. A method for operating cupola furnaces, which method consists in operating the furnace with a smaller quantity of charge coke than usual and substituting for the lacking portion of the usual quantity of charge coke easily oxidizable iron pieces poor in carbon of small cross-section and large surface, charged into the furnace in loose condition and acting as heat generating means.

3. A method for operating cupola furnaces, which method consists in operating the furnace with a smaller quantity of charge coke than usual and substituting for the lacking portion of the usual quantity of the charge coke easily oxidizable steel wool of small cross-section and large surface, charged into the furnace in loose condition and acting as heat generating means.

4. A method as specified in claim 1, in which the easily oxidizable metal serving as heat generating means is introduced into the furnace together with the coke.

5. A method for operating cupola furnaces, which method consists in operating the furnace with a quantity of charge coke from 40% to 60% less than the usual quantity of charge coke, the lacking quantity of charge coke being replaced by a steel wool addition amounting to from 15% to 30% of the usual weight of the charge coke.

6. A method as specified in claim 1, in which aluminium waste forms at least part of the easily oxidizable metal.

7. A method as specified in claim 1, in which the furnace is charged with pig iron and broken cast iron to produce cast iron.

8. A method as specified in claim 1, in which the cupola iron charges contain steel for providing high-duty cast iron of high temperature.

9. A method as specified in claim 1, in which the cupola iron charges contain iron poor in carbon for providing high-duty cast iron of high temperature.

10. A method, as claimed in claim 1, in which the material serving as heat generating means is introduced into the furnace together and mixed with the coke.

KARL LAUER.